(12) United States Patent
Mitarai et al.

(10) Patent No.: US 9,842,279 B2
(45) Date of Patent: Dec. 12, 2017

(54) DATA PROCESSING METHOD FOR LEARNING DISCRIMINATOR, AND DATA PROCESSING APPARATUS THEREFOR

(71) Applicant: CANON KABUSHIKI KAISHA, Tokyo (JP)

(72) Inventors: Yusuke Mitarai, Tokyo (JP); Masakazu Matsugu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 103 days.

(21) Appl. No.: 14/530,419

(22) Filed: Oct. 31, 2014

(65) Prior Publication Data

US 2015/0125072 A1    May 7, 2015

(30) Foreign Application Priority Data

Nov. 5, 2013   (JP) .................... 2013-229807

(51) Int. Cl.
*G06K 9/62* (2006.01)

(52) U.S. Cl.
CPC ......... *G06K 9/6217* (2013.01); *G06K 9/6282* (2013.01)

(58) Field of Classification Search
None
See application file for complete search history.

(56) References Cited

FOREIGN PATENT DOCUMENTS

JP    2010-287179 A    12/2010
JP    2011-216087 A    10/2011

OTHER PUBLICATIONS

Shapiro & Stockman, Computer Vision, Prentice Hall 2000.*
David Sontag, "Decision Trees", Lecture 12, New York University, 2013.*
L. Breiman, "Bagging Predictors", Machine Learning 26, p. 123-140, 1996.
L. Breiman, "Random Forests", Machine Learning 45, pp. 5-32, 2001.
Robert M. Haralick, K. Shanmugam, and Itshak Dinstein, "Texture Features for Image Classification", IEEE Transaction on System, Man and Cybernatic, vol. 6, pp. 610-621, 1973.
Mustafa Ozuysal, Michael Calonder, Vincent Lepetit and Pascal Fua, "Fast Keypoint Recognition using Random Ferns", IEEE Transactions on Pattern Analysis and Machine Intelligence, vol. 32, No. 3, pp. 448-461, Mar. 2010.

* cited by examiner

*Primary Examiner* — Mark Roz
(74) *Attorney, Agent, or Firm* — Canon U.S.A., Inc. IP Division

(57) ABSTRACT

A data processing method includes setting a learning data set including a plurality of learning data having respective labels to an uppermost node of a decision tree, setting selection probabilities of the learning data, selecting a combination of the learning data from each of a plurality of sets of learning data assigned to nodes of the decision tree in accordance with the selection probabilities, determining a branch rule for dividing each of the sets of the learning data assigned to the nodes of the decision tree into at least two subsets using the selected combination of the learning data, and assigning the subsets divided in accordance with the branch rule to nodes in a lower level.

9 Claims, 11 Drawing Sheets

DATA PROCESSING METHOD FOR LEARNING DISCRIMINATOR, AND DATA PROCESSING APPARATUS THEREFOR

BACKGROUND OF THE INVENTION

Field of the Invention

The present invention relates to a data processing method for learning a discriminator which performs predetermined discrimination on input data and a data discrimination method using the discriminator.

Description of the Related Art

In recent years, various methods have been proposed as a method for identifying a category of an input pattern or setting an input pattern as an explanatory variable so as to estimate an objective variable corresponding to the explanatory variable. Examples of the method include a method using a plurality of decision trees learned using a large number of learning data.

As represented by bagging trees disclosed in L. Breiman, "Bagging Predictors", Machine Learning 26, pp. 123 to 140, 1996, for example, first, a plurality of learning data subsets are generated using a large number of learning data by bootstrap sampling and decision trees are learned using the learning data subsets. Then a method for discriminating an input pattern by integrating outputs relative to the input pattern of the learned decision trees has been proposed.

In general, in a discrimination method integrally using a plurality of discriminators, it is important for the discriminators to have variation. In the bagging trees, a variety of learning data subsets generated by the bootstrap sampling are used for learning of the decision trees so that a variety of decision trees may be generated. Therefore, discrimination results of the decision trees relative to the input pattern are integrated so that high performance may be realized.

As a method for further enhancing variation, L. Breiman, "Random Forests", Machine Learning 45, pp. 5 to 32, 2001 discloses randomized trees in which branch rules of nodes of decision trees are selected at random when the decision trees are generated. By this, a variety of decision trees are generated although capabilities of the individual decision trees are low, and accordingly, high performance may be realized by using such decision trees.

Furthermore, in Japanese Patent Laid-Open No. 2010-287179, a discriminator generation method for enhancing capabilities of discriminators while enhancing variation of the discriminators is proposed. In this method, a relatively high selection probability is assigned to a discrimination rule which is effective for discrimination and discriminators are generated such that such a discrimination rule is preferentially selected. By this method, capabilities of the discriminators may be improved while variation of the discriminators is ensured, and consequently, high discrimination capabilities may be realized.

As described above, a method for learning discriminators having high discrimination capabilities while variation of the discriminators is enhanced is demanded as a method for learning a plurality of discriminators for performing discrimination using a plurality of discriminators.

The present invention provides a method for learning discriminators such that the discriminators have high discrimination capabilities while variation of the discriminators is ensured and provides a data discrimination method using the discriminators.

SUMMARY OF THE INVENTION

The present invention provides a data processing method including setting a learning data set including a plurality of learning data having respective labels to an uppermost node of a decision tree, setting selection probabilities of the learning data, selecting a combination of the learning data from each of a plurality of sets of learning data assigned to nodes of the decision tree in accordance with the selection probabilities, determining a branch rule for dividing each of the sets of the learning data assigned to the nodes of the decision tree into at least two subsets using the selected combination of the learning data, and assigning the subsets divided in accordance with the branch rule to nodes in a lower level.

Further features of the present invention will become apparent from the following description of exemplary embodiments with reference to the attached drawings.

DESCRIPTION OF THE EMBODIMENTS

Hereinafter, embodiments of the present invention will be described with reference to the accompanying drawings.

As a first embodiment of the present invention, an example of a method for learning a plurality of discriminators used in a method for discriminating whether a person of an input face image corresponds to one of a plurality of specific persons will be described. In this embodiment, decision trees are used as the discriminators.

Figure 1:
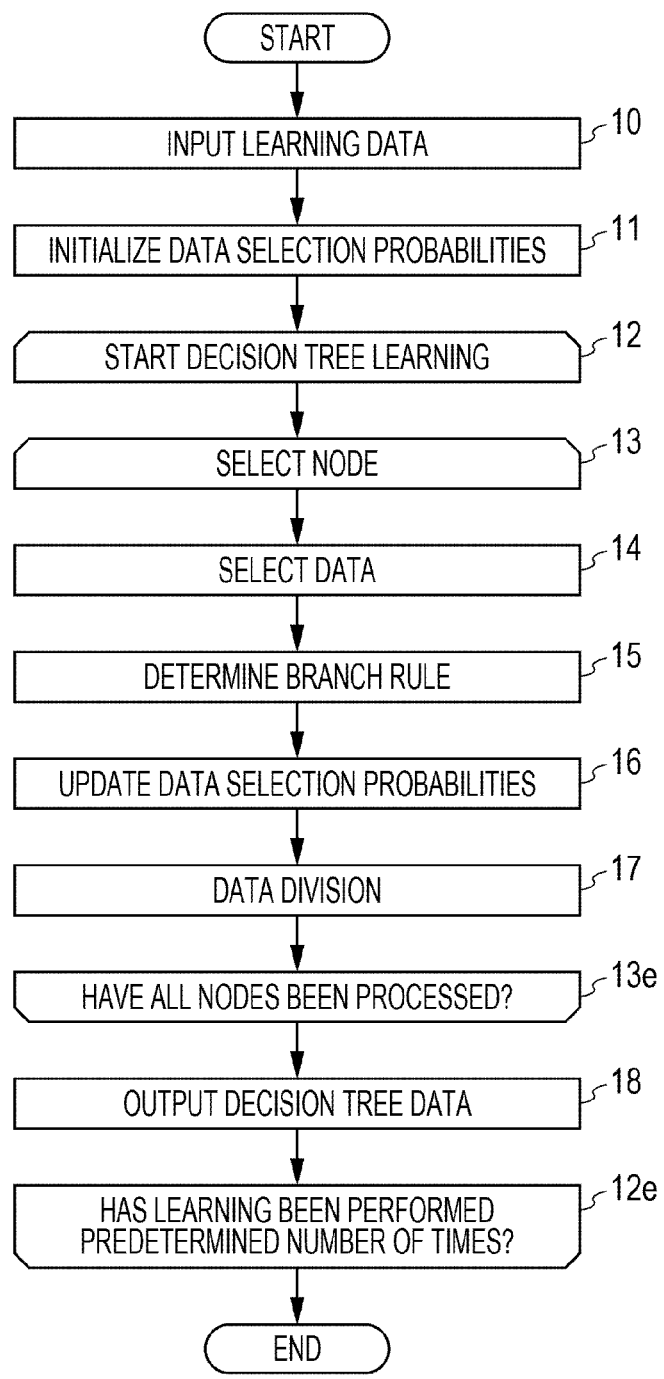
FIG. 1 is a flowchart illustrating a processing procedure of a discriminator learning method according to a first embodiment.
Figure 2:
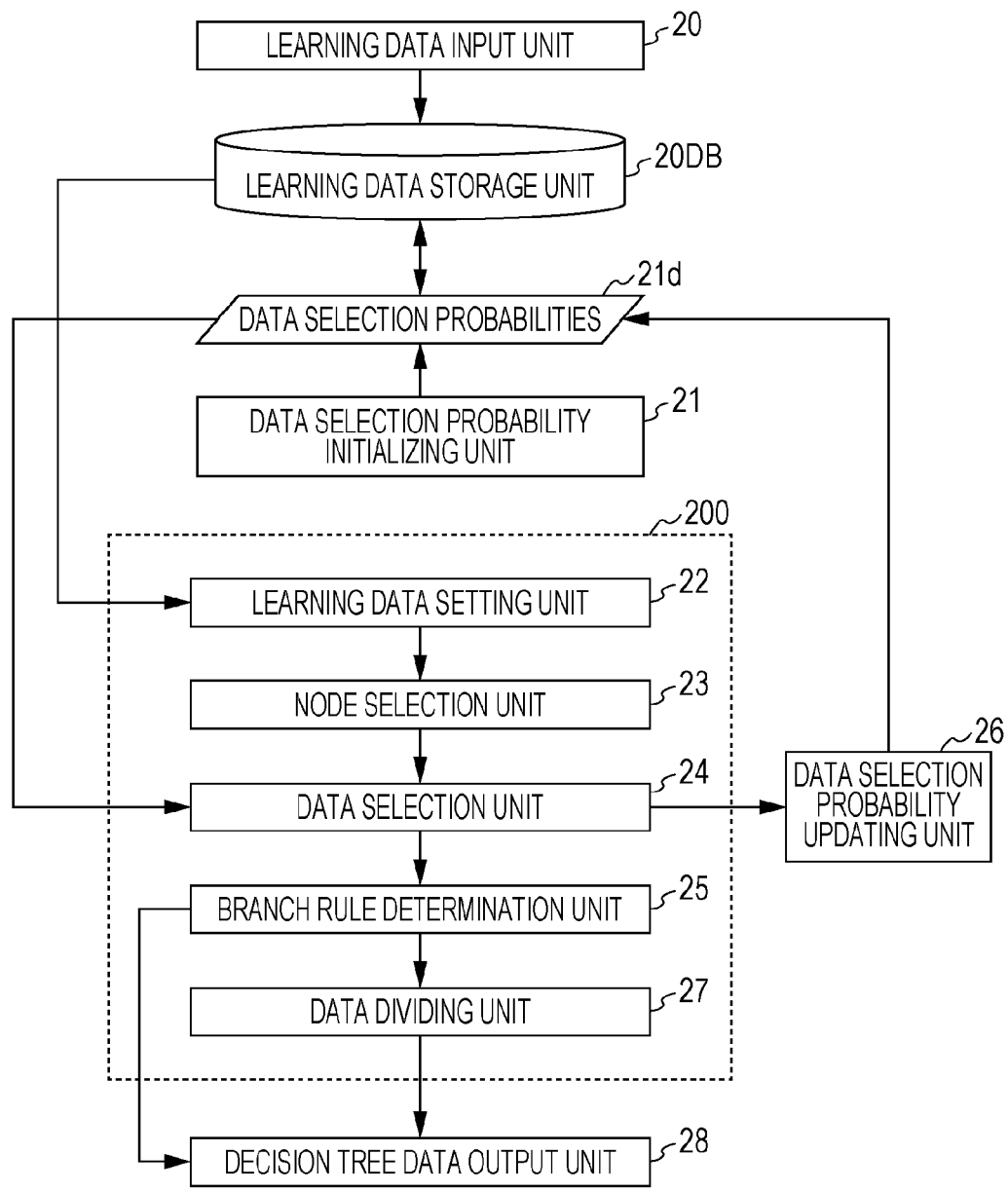
FIG. 2 is a block diagram illustrating a configuration of a discriminator learning apparatus according to the first embodiment.

FIG. 1 is a flowchart illustrating a process of a discriminator learning method of this embodiment. Furthermore, FIG. 2 is a block diagram illustrating a configuration of a discriminator learning apparatus of this embodiment. An example of the discriminator learning method of this embodiment will be described hereinafter with reference to FIGS. 1 and 2.

In step 10, a learning data input unit 20 inputs a large number of learning data to be used for learning of a plurality of discriminators. In this embodiment, face images of a large number of persons are used as a large number of learning data. Specifically, in this embodiment, gray-scale images having pixels in a matrix of 40 rows and 40 columns obtained by extracting regions of faces of persons are used.

Such an image is simply referred to as a "face image" hereinafter. Such face images include face images of a plurality of predetermined specific persons and face images of arbitrary persons other than the specific persons. In this embodiment, 10 predetermined specific persons are denoted by A to J, and face images of the persons are recorded in a learning data storage unit 20DB with labels of the corresponding persons. Furthermore, the face images of the arbitrary persons other than the specific persons are similarly stored in the learning data storage unit 20DB with a label representing that the arbitrary persons are not the predetermined specific persons.

It is assumed that, in data processing of this embodiment, 100 face images of each of the 10 specific persons captured under various situations are used as learning data. Furthermore, it is assumed that 3000 face images of the arbitrary persons other than the specific persons similarly captured under various situations are used as learning data. That is, 4000 face images are used as learning data in total. The learning data storage unit 20DB records the total 4000 face images with labels corresponding to the face images.

Next, in step 11, data selection probabilities 21d corresponding to the input learning data are provided, and a process of initializing values of the data selection probabilities 21d is performed. The data selection probabilities 21d are referred to in step 14 described below. More specifically, in step 14, data are selected from among the learning data with probabilities proportional to the values.

In step 11, a data selection probability initializing unit 21 performs a selection probability setting for setting a non-negative real value as a selection probability on each of the input learning data. This operation in step 11 corresponds to a process of initializing the real value, and in this embodiment, a uniform value is set to all the learning data. Specifically, 1 is simply set as the value in this embodiment. Note that, although a uniform value is set to the individual learning data in this embodiment, the present invention is not limited to this, and a larger value may be set to learning data corresponding to the predetermined specific persons, for example.

Subsequently, in step 12, learning of a first decision tree is started. A region defined by a dotted line in FIG. 2 represents a processing block 200 which performs the learning of a decision tree. Here, a learning data setting unit 22 sets a learning data set including all the learning data recorded in the learning data storage unit 20DB in an uppermost node of the decision tree.

Subsequently, in step 13, one of nodes of the decision tree is selected. Only the uppermost node of the decision tree is determined at the time of the start of the learning, and accordingly, the uppermost node is selected. After this time onwards, a node other than leaf nodes determined in step 17 below is selected. This node selection process is executed by a node selection unit 23.

Thereafter, in step 14, a data selection unit 24 selects a small number of learning data from among the learning data set in the node selected in step 13. The data selection unit 24 selects a small number of learning data in accordance with data selection probabilities corresponding to the learning data set in the selected node with reference to the data selection probabilities 21d. In this embodiment, the data selection unit 24 selects two learning data having different labels as a small number of learning data.

In step 15, a branch rule determination unit 25 determines a branch rule of the node on the basis of a small number of learning data selected in step 14. Here, a branch rule is obtained using a separation degree as a reference so that a number of selected learning data are more efficiently divided and the branch rule is set as the branch rule of the node. In each of the nodes of the decision tree of this embodiment, a method for performing branching in accordance with a result of a determination as to whether a pixel value in a position included in image data is larger than a predetermined pixel value is employed.

In this embodiment, the branch rule determination unit 25 searches for a pixel position in which a difference between the selected two learning data are largest in the same pixel position and obtains an average value of the pixels in the position. Then a rule for performing branching in accordance with a result of a determination as to whether a pixel value in a pixel position in which the difference is the largest is larger than the obtained average value is determined as a branch rule of the node.

In this embodiment, such a branch rule is determined as a branch rule for efficiently dividing learning data. However, the present invention is not limited to this, and any method may be used in accordance with a branch method of a decision tree. For example, in a case where a branch method for performing branching in accordance with a result of comparison between pixel values of two positions $x_1$ and $x_2$ in images is employed as the branch method of a decision tree, the two positions may be determined in accordance with a reference equation below.

$$\underset{x_1, x_2}{\operatorname{argmax}}[\{I_1(x_1) - I_1(x_2)\} - \{I_2(x_1) - I_2(x_2)\}] \qquad (1)$$

Here, "I(x)" denotes a pixel value in a position x, and subscripts of I are used to distinguish the selected two images. As described above, a branch rule for efficient division may be used in accordance with the branch method used for the decision tree and target data.

In step 16, a data selection probability updating unit 26 updates the data selection probabilities corresponding to a small number of learning data selected in step 14. In this process, the data selection probabilities corresponding to the learning data recorded in the data selection probabilities 21d and selected by the data selection unit 24 are updated. Here, a process of making the data selection probabilities corresponding to the learning data selected in step 14 small is performed so that the learning data selected in step 14 is hardly selected hereafter in step 14. Specifically, in this embodiment, the update is performed by multiplying the corresponding data selection probabilities by a value equal to or smaller than 1 (0.1, for example).

Subsequently, in step 17, a data dividing unit 27 divides a set of the learning data which are set to the node in accordance with the branch rule determined in step 15 and sets subsets of the divided learning data to nodes in a lower level. In this embodiment, since a branch rule in which a tree is divided into two branches is employed as the branch rule of the decision tree, the learning data set to the node is divided into two types of learning data.

The data dividing unit 27 newly generates nodes corresponding to the divided learning data and assigns the learning data to the nodes. Here, it is determined whether the learning data which are set to each of the nodes in the lower level have the same label, and when the determination is affirmative, the node is determined as a leaf node. Further division is not performed on the node determined as the leaf node. Therefore, the leaf node is not selected in step 13 as described above.

In step 13*e*, it is determined whether all nodes other than leaf nodes have been selected, and when the determination is negative, the process from step 13 to step 17 described above is executed again. This process is repeatedly performed, and when it is determined that all the nodes other than the leaf nodes have been selected, a learning process on a single decision tree is terminated.

After the learning process on a single decision tree is terminated, in step 18, a decision tree data output unit 28 outputs data on the decision tree which has been learned. The decision tree data output unit 28 records branch rules of the nodes determined by the branch rule determination unit 25 and information on the labels of the learning data set to the leaf nodes.

After the process in step 18 is terminated, the process returns to step 12 until the learning on a predetermined number of decision trees is performed, that is, a process of learning on a decision tree is repeatedly performed. When a predetermined number of decision trees are generated by performing the decision tree learning process a plurality of times, that is, when it is determined that a predetermined number of decision trees have been generated in step 12*e*, the discriminator learning process of this embodiment is terminated. It is preferable that the number of decision trees is sufficiently large although depending on a situation, and in this embodiment, 500 decision trees are learned and data on 500 decision trees are externally output.

Since the decision trees are learned by the method described above, the branch rules are determined by criteria for efficiently dividing learning data having different labels, and accordingly, capabilities of the individual decision trees may be further enhanced when compared with the randomized trees described above and the like. In particular, in nodes in a lower level near the leaf nodes, the number of learning data which remain in the nodes is small, and it is highly possible that the data are similar to one another. However, since the branch rules are determined using criteria set for efficiently dividing data having different labels, capabilities of the decision trees may be enhanced. Furthermore, data selection probabilities are obtained for the learning data, and a variety of data may be selected by making data selection probabilities small in accordance with a number of times selection is performed.

Therefore, the branch rules determined using the selected learning data have high variation, and as a result, variation of a plurality of decision trees may also be realized. In particular, in nodes in a higher level near the uppermost node, the number of learning data which are candidates to be selected is large, and accordingly, learning data are more variedly selected. Therefore, a variety of branch rules may be determined, and accordingly, a variety of combinations of learning data are set to nodes in a lower level. Consequently, variation of decision trees may be realized. As described above, in the discriminator learning method of this embodiment, capabilities of individual discriminators may be enhanced while variation of the discriminators is ensured, and accordingly, it is highly likely that high discrimination capability is realized by the data discrimination method using the discriminators.

An example of a pattern discrimination method for discriminating whether a person of an input face image corresponds to one of a plurality of predetermined specific persons using the discriminators will be described.

Figure 3:
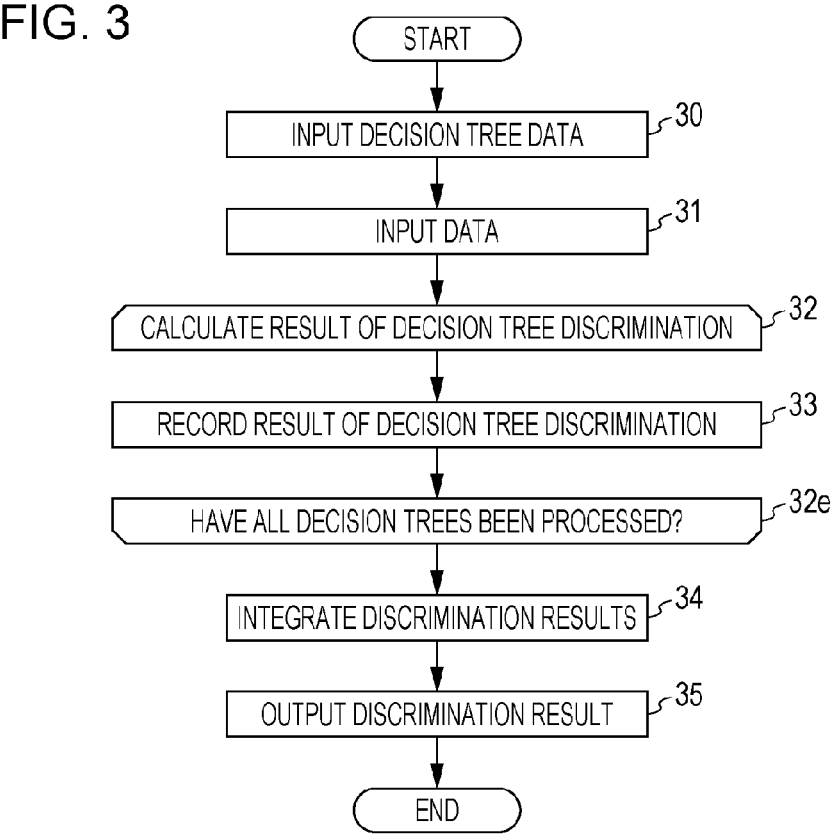
FIG. 3 is a flowchart illustrating a processing procedure of a pattern discrimination method according to the first embodiment.
Figure 4:
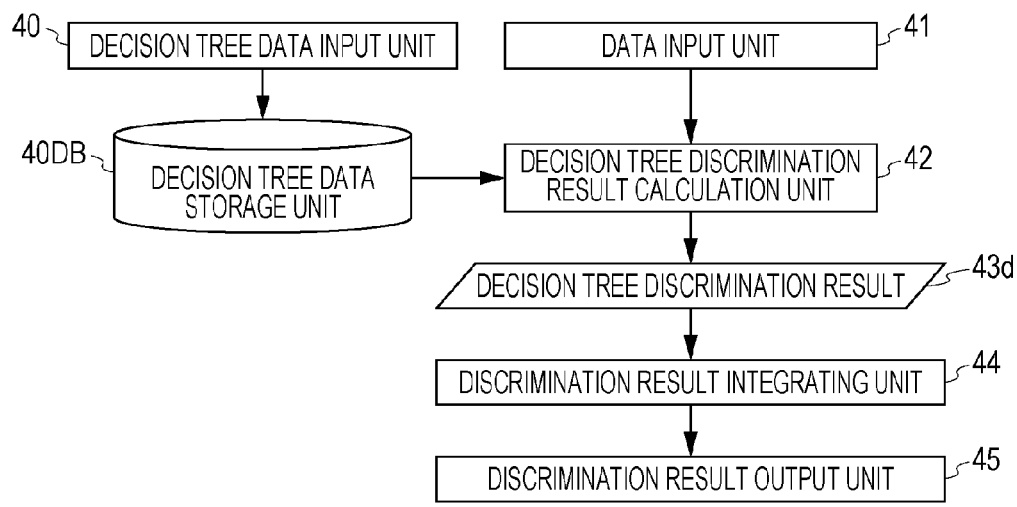
FIG. 4 is a block diagram illustrating a configuration of a pattern discrimination apparatus according to the first embodiment.

FIG. 3 is a flowchart illustrating processing of a pattern discrimination method of this embodiment. FIG. 4 is a block diagram illustrating a configuration of a pattern discrimination apparatus of this embodiment. An example of the pattern discrimination method of this embodiment will be described hereinafter with reference to FIGS. 3 and 4.

First, a decision tree data input unit 40 inputs the data on the decision trees learned by the method described above in step 30. The decision tree data input unit 40 inputs the decision tree data output from the decision tree data output unit 28 described above and stores the decision tree data in a decision tree data storage unit 40DB.

Subsequently, in step 31, a data input unit 41 inputs data on face images similarly to the images used in the learning of decision trees as input data serving as discrimination target data. In this embodiment, gray-scale images having pixels in a matrix of 40 rows and 40 columns obtained by extracting regions of faces of persons are used as the face images as described above.

In step 32, a decision tree discrimination result calculation unit 42 performs a discrimination process on the data input in step 31 using a first decision tree. The decision tree discrimination result calculation unit 42 selects one of the decision trees recorded in the decision tree data storage unit 40DB, and performs a search process using the decision tree starting from branching of the input data in accordance with the branch rule corresponding to the uppermost node. Then a label corresponding to a leaf node finally reached is determined as a result of the discrimination using the decision tree.

In step 33, the decision tree discrimination result calculation unit 42 records the discrimination result of the decision tree obtained in step 32, that is, information on the label corresponding to the leaf node finally reached. Here, the decision tree discrimination result calculation unit 42 cumulatively records obtained labels in a decision tree discrimination result 43*d*. For example, in this embodiment, if the discrimination result represents a label corresponding to A representing one of the predetermined specific persons, the decision tree discrimination result calculation unit 42 votes for a possibility that the person is A. Furthermore, if the discrimination result represents a label corresponding to a person other than persons having predetermined features, the decision tree discrimination result calculation unit 42 votes for a possibility that the person is other than the specific persons.

The decision tree discrimination result calculation unit 42 repeatedly performs the process in step 32 and step 33 performed on one decision tree on all the decision trees recorded in the decision tree data storage unit 40DB. In step 32*e*, the process proceeds to step 34 when the process has been performed on all the decision trees.

In step 34, a discrimination result integrating unit 44 integrates discrimination results of the decision trees to obtain a final discrimination result. In this embodiment, the discrimination result integrating unit 44 simply determines one of the discrimination results which has the largest number of votes as the final discrimination result. Specifically, when a possibility that the person is B has the large number of votes as a discrimination result of the large number of decision trees, it is determined that input data corresponds to a face image of B. Finally, in step 35, a discrimination result output unit 45 externally outputs the final discrimination result calculated in step 34.

By the process described above, discrimination as to whether data on an input face image corresponds to one of a plurality of predetermined specific persons may be performed using the plurality of decision trees described above. Accordingly, even when reliability of discrimination results of the individual discriminators is low, it is highly likely that high discrimination capability is realized by integrating results output from a number of various discriminators. In this embodiment, it is highly likely that the capabilities of the individual discriminators are improved relative to the randomized trees described above while variation of a number of discriminators is ensured, and consequently, it is highly likely that final discrimination capability is improved.

Note that, although the learning of decision trees is performed as described above in this embodiment, restriction of a depth, pruning, and the like which are applicable to general decision trees may be performed. Here, a leaf node may have learning data of different labels, and in this case, a ratio of the learning data of different labels is recorded at the time of learning and a vote may be performed in accordance with the ratio.

Furthermore, although the two learning data are selected and the branch rule of the decision tree is determined in accordance with the selected learning data, the number of learning data to be selected is not limited to 2, and other numbers may be employed. For example, four data, that is, target learning data and three other learning data which have labels different from a label of the target learning data, are selected, and a branch rule may be determined so that the target learning data and the other three learning data are more efficiently divided.

Furthermore, although an example of a binary tree is described in this embodiment, the present invention is generally applicable to N-ary trees. In this case, three learning data having different labels, for example, may be selected and a branch rule for division into three which realize efficient division may be determined.

Furthermore, although a discrimination result which has the largest number of votes is simply determined as a final discrimination result in the discrimination of this embodiment, if the learning data are deviated depending on labels, an erroneous determination may be made due to the deviation. Accordingly, a final discrimination result may be obtained by multiplying the numbers of votes corresponding to the individual labels by corresponding predetermined coefficients and comparing values obtained after the multiplication. Here, the term "predetermined coefficients" are determined in accordance with the numbers of data of the individual labels or determined such that test data are provided separately from the learning data and discrimination capabilities are enhanced when the test data are used.

In a second embodiment, an example of a learning method of discriminators which perform imaging and evaluation of parameters of preprocessing in a pattern discrimination method in which an image of specific stacked objects is captured and approximate positions and approximate orientation of the stacked objects are estimated with reference to the captured image will be described. Also in this embodiment, decision trees are used as the discriminators.

First, an object and outline of parameter evaluation in this embodiment will be described. Japanese Patent Laid-Open No. 2011-216087 discloses a pattern discrimination method in which an image of specific stacked objects is captured and approximate positions and approximate postures of the stacked objects are estimated with reference to the captured image.

In general, in such a pattern discrimination method, discrimination capabilities may be improved by appropriately setting parameters for the individual objects. Examples of the parameters include parameters used at a time of imaging, such as an exposure time, and parameters for preprocessing, such as a filter size used at a time of edge extraction performed as the preprocessing. In this embodiment, a plurality of decision trees used for imaging and used for evaluating preprocessing parameters are learned without providing correct results to be output by the discrimination method, that is, correct values of approximate positions and approximate postures of the stacked objects which are subjected to imaging. Then, in accordance with a result of the evaluation using the plurality of decision trees, appropriate parameters for the imaging and the preprocessing are to be set.

Specifically, first, the imaging and the preprocessing are actually performed using various parameters, and preprocessed images which are intermediate data corresponding to the parameters are generated as a result of the imaging and the preprocessing. Next, a plurality of predetermined feature values are extracted from each of the preprocessed images so that feature data are generated. Then, using a plurality of decision trees learned such that discrimination capabilities of the decision trees are estimated in accordance with the plurality of feature data, discrimination capabilities of the decision trees are estimated by the plurality of feature data extracted from the preprocessed images.

Specifically, the discrimination capabilities are estimated in accordance with the plurality of feature values extracted from the preprocessed images generated in accordance with the parameters. Then the estimated discrimination capabilities are set as evaluation values of the parameters, and one of the parameters having the highest evaluation value is set as an appropriate parameter for a target object. As described above, in this embodiment, a plurality of decision trees are learned as regression models in which the feature values of the parameters are output as explanatory variables and the estimated values of the corresponding discrimination capabilities are output as objective variables.

Figure 9:
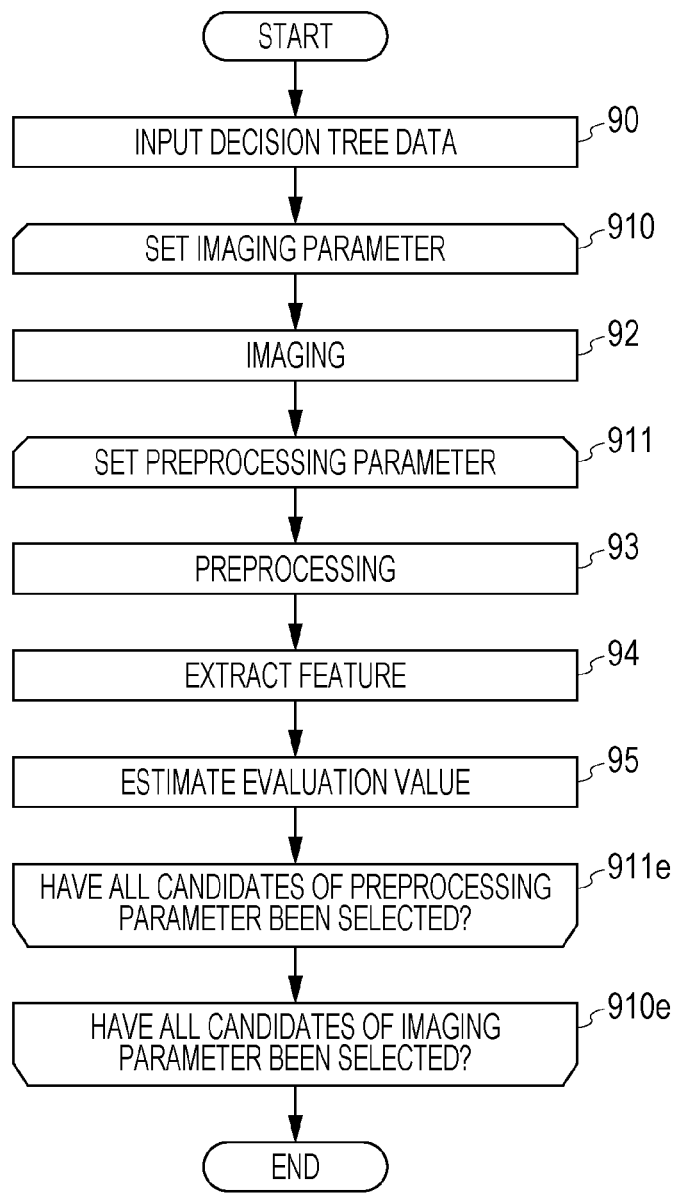
FIG. 9 is a flowchart illustrating a processing procedure of a parameter selection method using a discriminator which is learned by the discriminator learning method according to the second embodiment.
Figure 10:
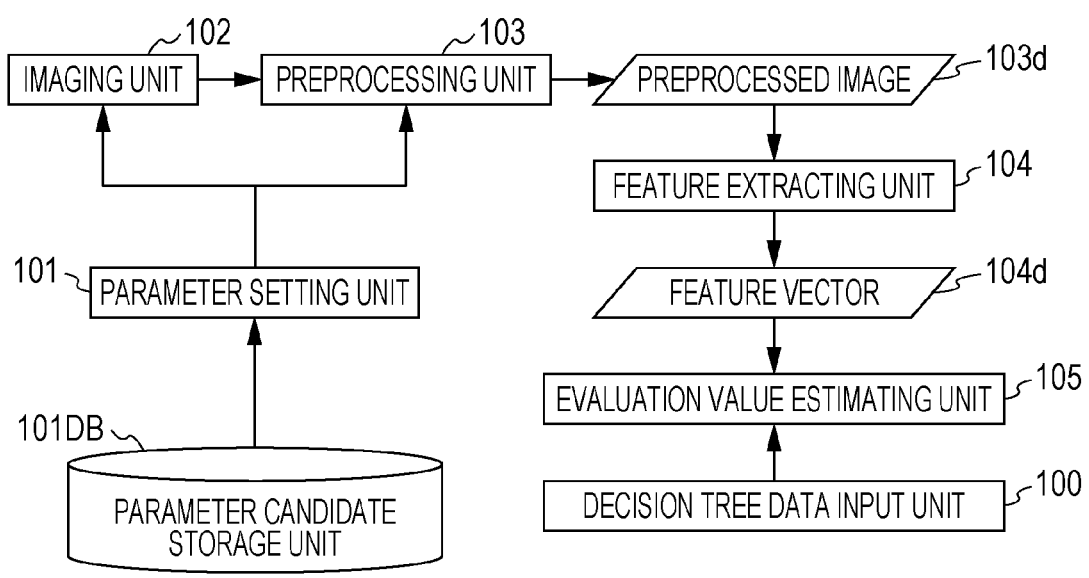
FIG. 10 is a block diagram illustrating a configuration of a parameter selection apparatus using a discriminator which is learned by the discriminator learning method according to the second embodiment.

For explanation, a parameter selection method for selecting appropriate parameters using discriminators learned by the discriminator learning method of this embodiment will be described. FIG. 9 is a flowchart illustrating a process of the parameter selection method of this embodiment. FIG. 10 is a block diagram illustrating a configuration of a parameter selection apparatus of this embodiment. The parameter selection method of this embodiment will be described hereinafter with reference to FIGS. 9 and 10.

In step 90, a decision tree data input unit 100 inputs decision tree data to be used to calculate estimated values of discrimination capabilities in step 95 described hereinafter. Here, decision tree data which is generated in advance is input. The decision tree data and a method for learning the decision tree data will be described in detail hereinafter.

A parameter setting unit 101 reads various parameters recorded in a parameter candidate storage unit 101DB in advance and sets the parameters to an imaging unit 102 and a preprocessing unit 103. The various parameters to be set to the imaging unit 102 and the preprocessing unit 103 are stored in the parameter candidate storage unit 101DB.

Examples of items of parameters to be set to the imaging unit 102 include an exposure time and a gain of an amplifier, and candidates of values of the parameters corresponding to the items are recorded. Specifically, as for the exposure time, for example, candidates of parameters to be set as the exposure time, such as 1 ms, 2 ms, 4 ms, . . . , and 500 ms, are recorded.

In this embodiment, Nt candidates of parameters are recorded as the exposure time, and Ng candidates of parameters are recorded as the gain of an amplifier. The parameter setting unit 101 reads the candidates and performs a process of sequentially setting all combinations of the candidates (that is, Nt×Ng combinations in this embodiment) to the imaging unit 102. This process corresponds to step 910 of FIG. 9. After imaging parameters are set, in step 92, an image of the specific stacked objects which is captured by the imaging unit 102 in accordance with the set parameters is supplied to the preprocessing unit 103.

Subsequently, in step 911, the parameter setting unit 101 performs a process of setting parameters to the preprocessing unit 103 similarly to the case of the imaging unit 102. Examples of items of the parameters to be set to the preprocessing unit 103 include a size of a smoothing filter used for removing noise and a coefficient used for y correction. Furthermore, in addition to items set as continuous values, items set as binary values, such as a determination as to whether or not bias correction is to be performed, may be provided. Moreover, items set as multi-values, such as a determination as to whether a Sobel filter, a Prewitt filter, or a Laplacian filter is to be used in an edge extraction process may be provided.

Furthermore, the items may include order of performance of the smoothing filter, the y correction and the edge extraction process, for example. In this embodiment, it is assumed that Np combinations of parameter candidates associated with various items are generated, and a process of sequentially setting the combinations to the preprocessing unit 103 is performed. After setting the preprocessing parameters, in preprocessing step 93, a process of performing preprocessing based on the set parameters on an image supplied from the imaging unit 102 is performed by the preprocessing unit 103 so that a preprocessed image 103d is generated.

Next, in step 94, a feature extraction unit 104 extracts a plurality of predetermined feature values based on the preprocessed image 103d. Various items may be used as the feature values. In this embodiment, f feature values including an average value of luminance values of the preprocessed image 103d, distribution, skewness, kurtosis, mode, entropy, and a texture feature value using a co-occurrence matrix disclosed in the following document are used.

Robert M. Haralick, K. Shanmugam, and Itshak Dinstein, "Textural Features for Image Classification", IEEE Transactions on System, Man and Cybernatic, Vol. 6, pp. 610 to 621, 1973.

The feature extraction unit 104 extracts such feature values from the preprocessed image 103d and generates a feature vector 104d obtained by sequentially arranging the feature values as feature data. In this embodiment, the feature extraction unit 104 extracts feature values representing macro features of the preprocessed image 103d, and any feature values may be employed as long as the feature values represent features of the preprocessed image 103d.

In step 95, the evaluation value estimating unit 105 obtains evaluation values of the parameters set by the parameter setting unit 101 in accordance with the feature vector 104d generated by the feature extraction unit 104 using the plurality of decision tree data input in step 90. The decision tree data are regression models which use the feature vector 104d obtained by arranging the f feature values extracted from the preprocessed images 103d as an explanatory variable and uses a discrimination capability obtained when a discrimination process is performed on the preprocessed image 103d as an objective variable.

Figure 11:
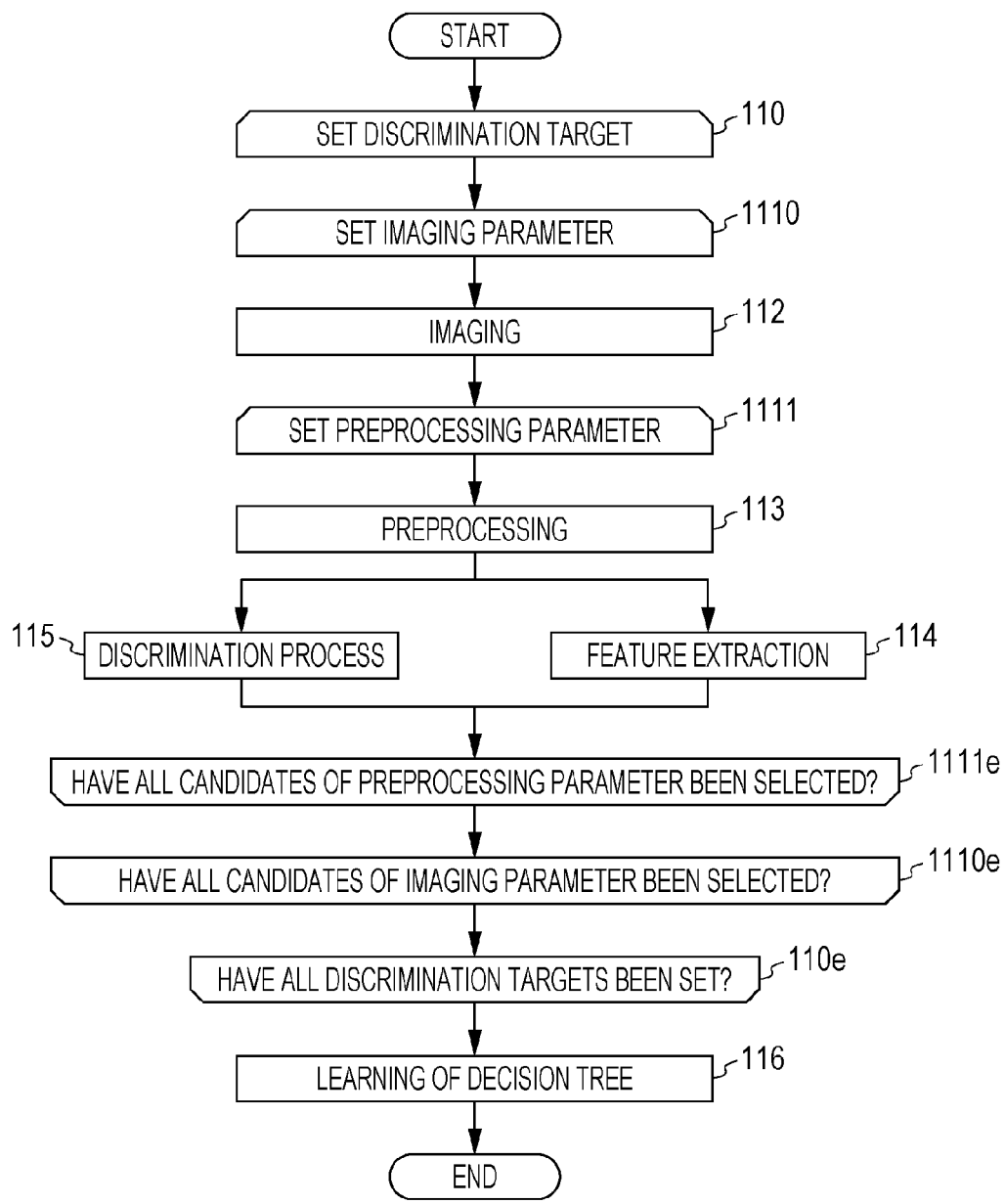
FIG. 11 is a flowchart illustrating a processing procedure of learning of a discriminator and a learning data generation method used for the learning according to the second embodiment.
Figure 12:
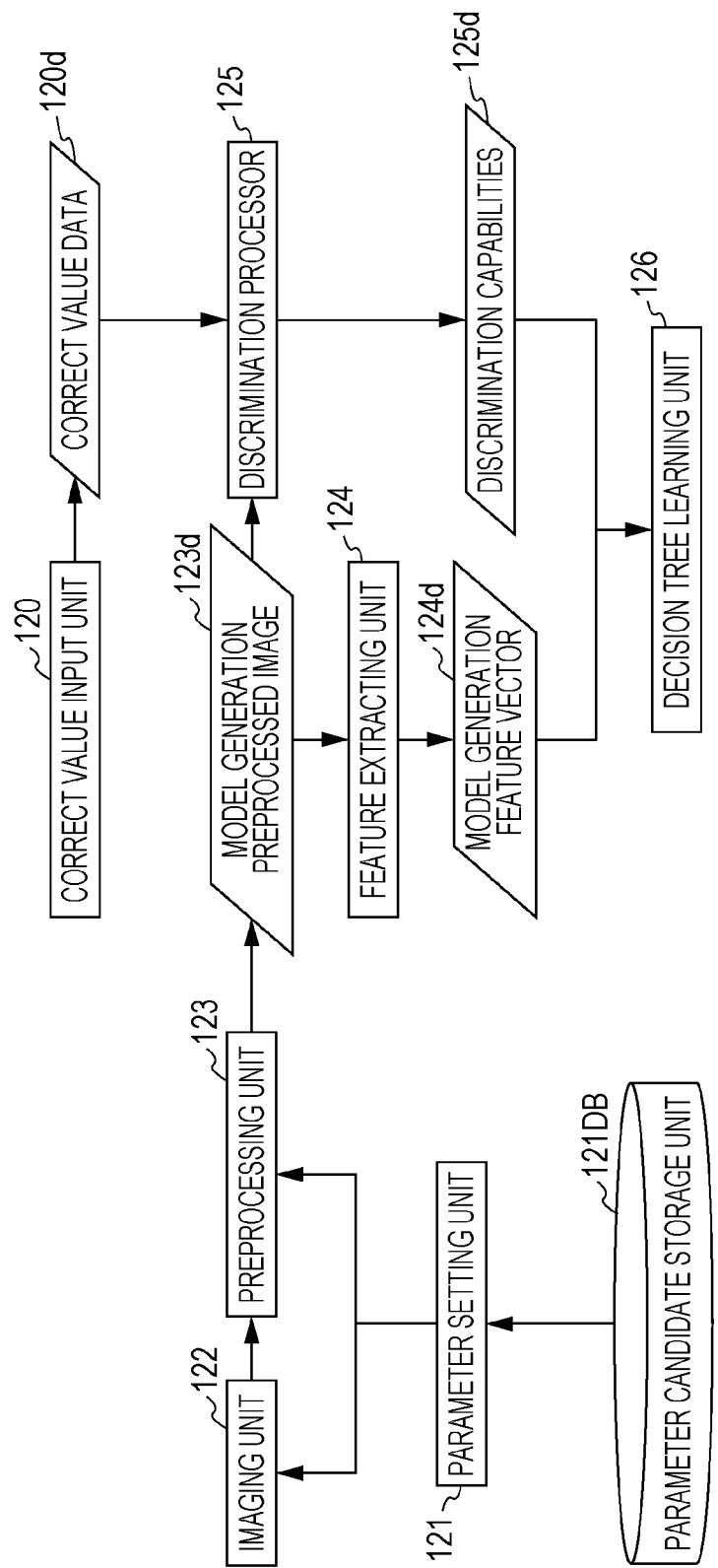
FIG. 12 is a block diagram illustrating a configuration of a learning data generation apparatus used for learning of a discriminator and a learning data generation method used for the learning according to the second embodiment.

Here, the decision tree and a method for generating learning data used to perform learning of the decision trees of this embodiment will be described in detail. FIG. 11 is a flowchart illustrating a process of learning discriminators and a learning data generation method used for the learning according to this embodiment. FIG. 12 is a block diagram illustrating a configuration of a learning data generation apparatus of this embodiment.

A learning data generation method of this embodiment will be described hereinafter with reference to FIGS. 11 and 12. Note that a configuration of the learning data generation apparatus of this embodiment is mostly the same as that of the parameter selection apparatus of FIG. 10. Therefore, descriptions of the same portions are omitted, and different portions will be described in detail.

As described above, the discriminators of this embodiment are regression models which estimate discrimination capabilities by the discrimination method using the preprocessed image 103d in accordance with the feature vector 104d obtained by arranging a plurality of feature values extracted from the preprocessed image 103d. For learning of the regression models, a large number of model generation data which are combinations of feature vectors (explanatory variables) which are input and discrimination capabilities (objective variables) which are output corresponding to the feature vectors are used. Therefore, first, data including combinations of explanatory variables and objective variables are generated using various objects, and discriminators are learned using the data. Here, as with the first embodiment, decision trees are used as the discriminators in this embodiment.

In order to obtain the objective variables, that is, the discrimination capabilities, correct values to be output by the discrimination method are provided in advance as described above. Therefore, in this embodiment, the various stacked objects are provided, and approximate positions and approximate postures of the individual stacked objects in the image of the stacked objects are provided as correct values. The provided correct values are input by a correct value input unit 120 and stored as correct value data 120d. A process of providing the stacked objects and the corresponding correct values corresponds to step 110.

The correct values of the approximate positions and the approximate postures of the objects may be obtained by designating positions of a plurality of predetermined portions of the objects in the image of the stacked objects, for example. Although the provision of the correct values requires a large amount of cost, this operation is required only in a generation stage of a discrimination capability estimation model generated in advance, and the operation is performed on a number of cases in this stage. Specifically, once decision trees are learned, correct values are not required to be provided for a new object, and accordingly, the cost for provision of the correct values may be suppressed.

The various objects used in this embodiment do not include an object having a parameter to be evaluated. If the various objects used in this embodiment include an object having a parameter to be evaluated, the parameter may be evaluated by estimating an actual discrimination capability using correct values of an approximate position and an approximate posture of the object provided in this embodiment.

After the stacked objects and the correct values are provided, a process of obtaining a number of explanatory variables, that is, feature vectors extracted from the preprocessed image, and objective variables corresponding to the explanatory variables, that is, discrimination capabilities, of the stacked objects is performed.

A process from step 1110 to step 113 and step 114 of FIG. 11 is the same as the process from step 910 to step 94 of FIG. 9. Specifically, first, a parameter setting unit 121 reads candidates of parameters from a parameter candidate storage unit 121DB and sets the candidates to an imaging unit 122 (step 1110). Then the imaging unit 122 captures an image of the stacked objects which have been provided (step 112). Next, similarly, candidates of parameters are set to a preprocessing unit 123 (step 1111), and the preprocessing unit 123 performs preprocessing on the captured image so as to generate a model generation preprocessed image 123d (step 113).

The model generation preprocessed image 123d means a preprocessed image as intermediate data for generation of a model used to generate data for learning a decision tree. Then a feature extraction unit 124 extracts a plurality of predetermined feature values from the model generation preprocessed image 123d and generates a model generation feature vector 124d by arranging the feature values (step 114). The model generation feature vector 124d is a feature vector used as an explanatory variable in the learning of a decision tree.

In step 115, a discrimination processor 125 performs a process of performing a discrimination process on the model generation preprocessed image 123d and comparing a result of the discrimination with the correct value data 120d provided in advance so as to obtain a discrimination capability 125d. In this embodiment, a pattern discrimination method disclosed in Japanese Patent Laid-Open No. 2011-216087 is used so that a process of obtaining a plurality of candidates of approximate positions and approximate postures of objects in order of reliability is performed. Then if an error between a candidate and a correct value included in the correct value data 120d is within a predetermined value (position displacement is within several pixels and posture displacement is within several degrees, for example), it is determined that discrimination of the candidate is successfully performed, and precision and recall are calculated for individual candidates. Finally, an average of precisions for each recall, that is, average precision is obtained, and is determined as the discrimination capability 125d.

In a process from step 1110 to step 114 or step 115 of FIG. 11, one model generation feature vector 124d (an explanatory variable) and one discrimination capability 125d (an objective variable) are obtained for one aggregate of stacked objects. Then data including a combination of the obtained model generation feature vector 124d and the discrimination capability 125d is transmitted to a decision tree learning unit 126. This data is used to learn a decision tree as described above.

The process from step 1110 to step 114 or step 115 is repeatedly performed a number of times corresponding to the number of candidate parameters. In this way, a plurality of combinations of model generation feature vectors 124d and discrimination capabilities 125d are generated for the aggregate of stacked objects which is provided in advance. This process is repeatedly performed until a condition for terminating selection of all preprocessing parameter candidates is satisfied in step 1111e and a condition for terminating selection of all imaging parameter candidates is satisfied in step 1110e. If the number of candidates for imaging parameters is Nc and the number of candidates for preprocessing parameters is Np, Nc×Np combinations of the model generation feature vectors 124d and the discrimination capabilities 125d are generated for one aggregate of stacked objects.

All data on the combinations of the model generation feature vectors 124d and the discrimination capabilities 125d are transmitted to the decision tree learning unit 126. By this, a process performed on the aggregate of stacked objects which is provided in advance is terminated. The process performed on the aggregate of stacked objects is performed on a predetermined number of aggregates of stacked objects. Although the predetermined number of aggregates of stacked objects, that is, the number of aggregates of stacked objects to be subjected to the process, is preferably large, 10 to 20 aggregates are also allowable. After the process performed on a predetermined number of aggregates of stacked objects is terminated, that is, when the condition for terminating a setting of all discrimination targets is satisfied in step 110e, the process proceeds to step 116.

In step 116, the decision tree learning unit 126 learns a large number of decision trees which are regression models in accordance with the data including the combinations of the model generation feature vectors 124d and the discrimination capabilities 125d. By this process, assuming that the number of aggregates of stacked objects is denoted by "Ny", the number of candidates of imaging parameters is denoted by "Nc", and the number of candidates of preprocessing parameters is denoted by "Np", Ny×Nc×Np combinations of the model generation feature vectors 124d and the discrimination capabilities 125d are obtained. When Ny is 20, Nc is 30, and Np is 4000, 2400000 (20×30×4000) combinations of data are obtained. The decision tree learning unit 126 generates a large number of decision trees as regression models having the model generation feature vectors 124d as explanatory variables and the discrimination capabilities 125d as objective variables using a large number of combinations of data.

Figure 5:
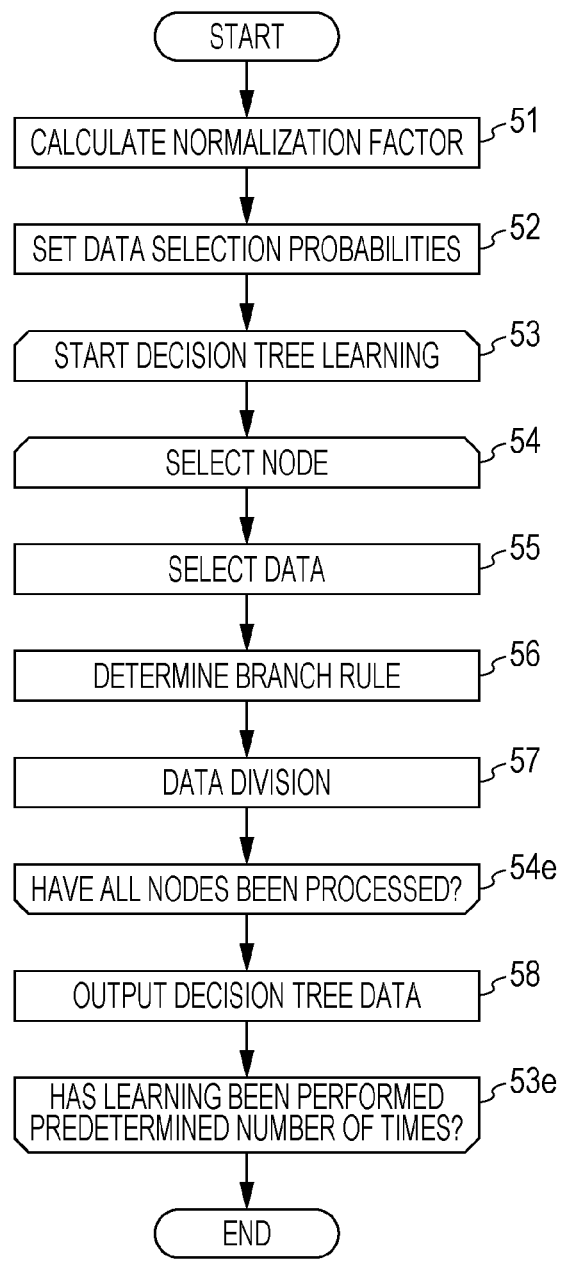
FIG. 5 is a flowchart illustrating a processing procedure of a discriminator learning method according to a second embodiment.
Figure 6:
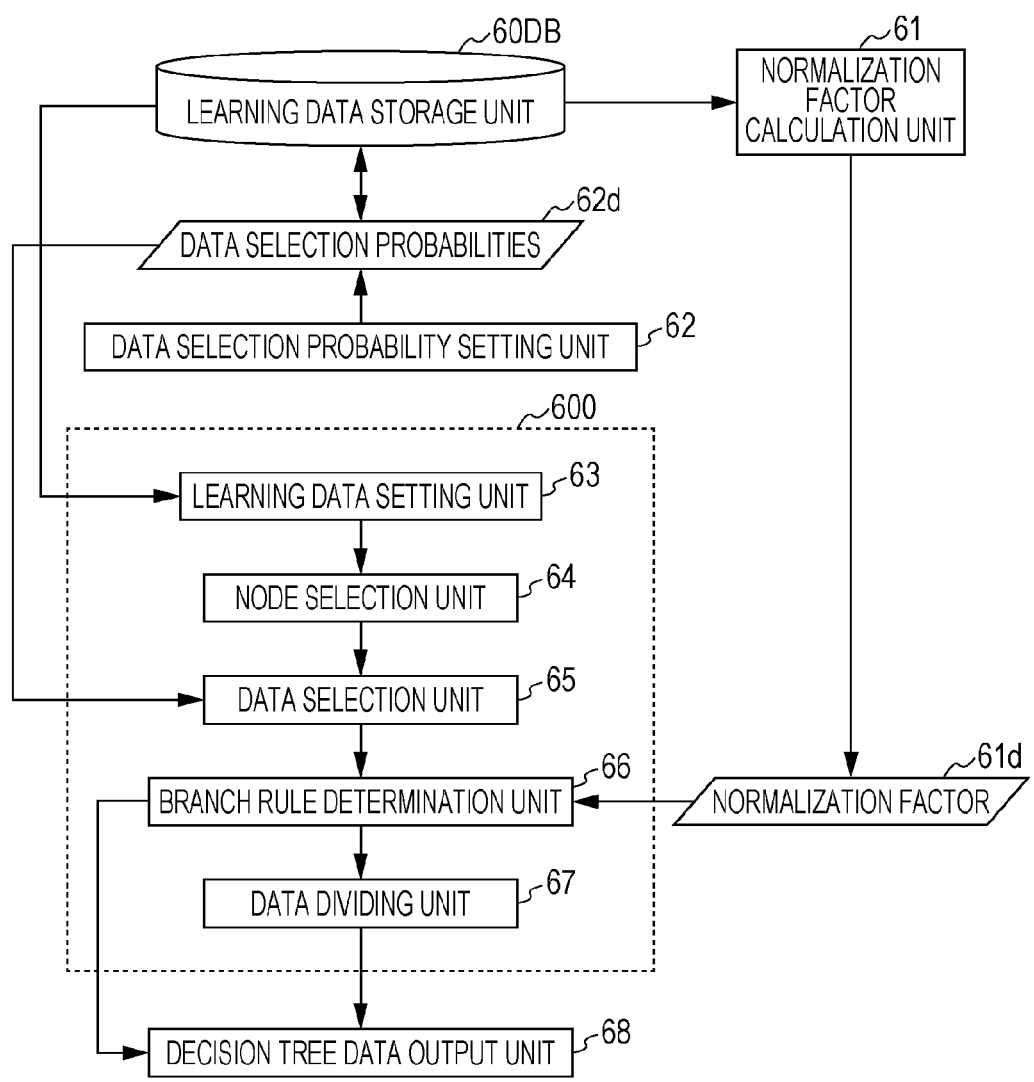
FIG. 6 is a block diagram illustrating a configuration of a discriminator learning apparatus according to the second embodiment.

FIG. 5 is a flowchart illustrating a process of the discriminator learning method of this embodiment. FIG. 6 is a block diagram illustrating a configuration of a discriminator learning apparatus of this embodiment. An example of the discriminator learning method of this embodiment will be described hereinafter with reference to FIGS. 5 and 6. Descriptions of operations in the process of the discriminator learning method of this embodiment which are the same as those of the process of the discriminator learning method of the first embodiment are omitted. Furthermore, by the process terminated in step 116 of FIG. 11, a large number of combinations of model generation feature vectors 124d and discrimination capabilities 125d are input to the decision tree learning unit 126 and are recorded in a learning data storage unit 60DB of FIG. 6.

First, in step 51, a normalization factor calculation unit 61 obtains standard deviations of elements of all the model generation feature vectors 124d recorded in the learning data storage unit 60DB. Then the normalization factor calculation unit 61 performs a process of calculating reciprocal numbers of the standard deviations as normalization factors 61*d* of the corresponding vector elements. The normalization factors 61*d* obtained here are used when branch rules of decision trees are determined in step 56 described hereinafter.

Next, in step 52, data selection probabilities 62*d* illustrated in FIG. 6 of the input learning data is provided, and a process of setting values of the data selection probabilities 62*d* is performed. The data selection probabilities 62*d* are referred to in step 55 described below, and as with the first embodiment, data are selected from among the learning data with probabilities proportional to the values of the data selection probabilities 62*d*. In step 52, a data selection probability initialization unit 62 sets non-negative real values corresponding to input learning data on a one-to-one basis.

In this embodiment, unlike the first embodiment, a uniform probability is not set to all the learning data, but a relatively large data selection probability is set to data which have a high degree of importance and which are preferably selected. Specifically, in this embodiment, although learning data has a model generation feature vector 124*d* and a discrimination capability 125*d*, a high data selection probability is set to learning data having a high discrimination capability or a low discrimination capability. This is because, instead of a middle discrimination capability, enhancement of an estimation capability for a case where a discrimination capability is high or a discrimination capability is low is important. As described above, the data selection probabilities may be set in accordance with objects of decision trees to be learned.

Furthermore, since a considerably large number of learning data are used for learning in this embodiment, unlike the first embodiment, the data selection probabilities are not updated during the learning of decision trees. This is because, when a considerably large number of learning data are used, probabilities that the individual learning data are selected are low in the first place, and accordingly, various learning data may be selected even when the data selection probabilities are not updated.

Subsequently, in step 53, a processing block 600 starts learning of a first decision tree. Here, as with the first embodiment, a learning data setting unit 63 sets all the learning data recorded in the learning data storage unit 60DB in an uppermost node of the decision tree.

Thereafter, as with the first embodiment, in step 54, the node selection unit 64 selects one of nodes other than leaf nodes of the decision tree. Furthermore, as with the first embodiment, in step 55, the node selection unit 64 selects a small number of learning data from among learning data set to the selected node in accordance with the data selection probabilities 62*d*. In this embodiment, unlike the first embodiment, discrimination capabilities represented by continuous values correspond to the labels of the first embodiment. Although the two learning data are selected also in this embodiment, the selection is not based on a difference between their labels. The two learning data selected in this embodiment have discrimination capabilities serving as objective variables which are different from each other by an amount of a predetermined value or more (0.05 or the like).

In step 56, a branch rule determination unit 66 determines a branch rule of a target node in accordance with the small number of learning data selected in step 55. The branch rule determination unit 66 obtains a branch rule for efficiently dividing the selected small number of learning data with reference to the normalization factors 61*d* obtained by the normalization factor calculation unit 61 and determines the obtained branch rule as a branch rule of the target node. As with the first embodiment, in nodes of the decision tree of this embodiment, a method for performing branching in accordance with a result of a determination as to whether one of elements of a feature vector serving as an explanatory variable is larger or smaller than a predetermined value is used.

In this embodiment, values of the elements of feature vectors serving as explanatory variables of the selected two learning data are multiplied by values corresponding to the normalization factors 61*d*, and a pair of elements which have the largest difference is searched for. Then an average value of the values of the elements is obtained. A branch rule for performing branching in accordance with a result of a determination as to whether a value of an element having the largest difference is larger than the obtained average value is used as a branch rule of the target node. The elements of the feature vector of this embodiment have values having different ranges of averages, distribution, and the like, and therefore, if a branch rule is directly determined in accordance with a difference between the values, it is likely that an element having a large range is selected.

Therefore, such a difference between ranges is absorbed by normalizing the values in accordance with the standard deviations associated with the elements as described above. Although the branch rule is determined by this method in this embodiment, as with the first embodiment, the present invention is not limited to this and any method may be employed as long as a branch rule is determined by a method for efficiently dividing learning data having different features.

Subsequently, in step 57, as with the first embodiment, the data dividing unit 67 divides learning data which is set to the target node in accordance with the branch rule determined in step 56 and sets the divided learning data to nodes in a lower level. In the first embodiment, when all learning data set in a lower node have the same label, the node is determined as a leaf node. In this embodiment, as described above, discrimination capabilities represented by continuous values correspond to the labels of the first embodiment.

Accordingly, a fact that all the learning data have the same label is not used as a reference but a fact that the largest difference between discrimination capabilities, among all combinations of learning data set to the node, is equal to or smaller than a predetermined value is used as a determination as to whether the node is a leaf node. As the predetermined value used here, a value the same as the predetermined value used as a reference of the data selection in step 55 may be used.

As with the first embodiment, the process from step 54 to step 57 is repeatedly performed until it is determined that all nodes other than the leaf nodes have been selected in step 54*e*. This process is repeatedly performed, and when it is determined that all nodes other than the leaf nodes have been selected, a learning process performed on a single decision tree is terminated.

After the learning process performed on a single decision tree is terminated, in step 58, a decision tree data output unit 68 outputs data on the decision tree which has been learned. The decision tree data output unit 68 records branch rules of the nodes determined by the branch rule determination unit 66 and values of objective variables corresponding to the leaf nodes. Here, in this embodiment, average values of discrimination capabilities corresponding to the learning data which remain in the leaf nodes are used as values of the objective variables corresponding to the leaf nodes.

Although the average values of the discrimination capabilities of the learning data which remain in the leaf nodes are used as the values of the objective variables corresponding to the leaf nodes, the decision tree learning method of this embodiment is not limited to this. For example, medians may be used instead of the average values, or instead of use of integrated values such as the average values and the medians, all discrimination capabilities corresponding to the learning data which remain in the leaf nodes may be recorded.

After the process in step 58 is terminated, as with the first embodiment, the process returns to step 53 so that the decision tree learning process is repeatedly performed until a predetermined number of decision trees are learned. When a predetermined number of decision trees are generated, that is, when it is determined that a predetermined number of decision trees are generated in step 53e, the process of the discriminator learning method of this embodiment is terminated. Also in this embodiment, it is preferable that the number of decision trees is sufficiently large, and therefore, learning of 500 decision trees are performed in this embodiment and data of the 500 decision trees are externally output.

The plurality of learned decision trees are used to obtain evaluation values of set parameters in the parameter selection method of this embodiment. This process corresponds to step 116, and by this process, the learning of the discriminators and the process of the learning data generation method employed in the learning are terminated.

The decision trees learned by the method described above are generated on the basis of cases of a large number of combinations of model generation feature vectors 124d and discrimination capabilities 125d. Therefore, it is highly possible that evaluation of parameters are more appropriately performed on the basis of a condition of extracted feature data and the like when compared with a method for evaluating parameters on a rule base.

In step 95, the evaluation value estimating unit 105 performs a process of obtaining estimated values of the discrimination capabilities in accordance with the feature vector 104d generated by the feature extraction unit 104 using the plurality of decision trees generated in advance by the method described above. Here, the process of obtaining estimated values of the discrimination capabilities using the plurality of decision trees is basically the same as that of the first embodiment. However, a portion in which results of the decision trees are integrated is slightly different, and therefore, the portion will be described. In the first embodiment, a discrimination result of each of the decision trees corresponds to a label representing a face image of a person. On the other hand, in this embodiment, unlike the first embodiment, integration of results by votes is not simply performed since a discrimination result of each of the decision trees corresponds to an estimated value of a discrimination capability which is a continuous value.

Therefore, in this embodiment, an average value of estimated values of the discrimination capabilities which are results of the decision trees are simply used as a final estimated value. Then the obtained estimated values of the discrimination capabilities are determined as evaluation values of parameters set by the parameter setting unit 101. By this, the evaluation values of the parameters of the imaging and the preprocessing set by the parameter setting unit 101 are obtained, and parameters appropriate for the pattern discrimination may be selected by selecting the parameters for imaging using the evaluation values.

Note that, in this embodiment, the average value of the results of the decision trees is used as the final estimated value as described above. However, the present invention is not limited to this, and a median of the results of the decision trees may be used, for example. Furthermore, as a method based on votes which is the same as the method employed in the first embodiment, the results of the decision trees may be quantized by an appropriate quantization level (every 0.05, for example), a vote may be performed for quantized sections, and a value corresponding to one of the sections which has the largest number of votes may be determined as a final result.

Furthermore, the final result is not limited to a value obtained by integrating discrimination results corresponding to learning data remaining in the leaf nodes as values corresponding to the leaf nodes of the decision trees as described above. The final result may be obtained by performing a weighted voting algorithm, for example, when all discrimination capabilities corresponding to the learning data are recorded. Specifically, if the number of learning data remaining in a leaf nodes is k, discrimination capabilities of the learning data may be quantized, a vote may be performed by a value of 1/k on corresponding sections, all voting results may be calculated, and a value corresponding to one of the sections which has the largest number of votes may be determined as a final result.

As described above, the discriminator learning method of the present invention is applicable as a method for learning a regression model for obtaining a desired objective variable using input data as an objective variable in addition to discrimination of discrete labels. Furthermore, if a considerably large number of learning data are used, various data are stochastically selected even when data selection possibilities are not updated, and as a result, various discriminators are generated. Accordingly, using the plurality of discriminators, it is highly likely that appropriate estimation performance may be realized. As described in this embodiment, when the data selection possibilities are not updated, learning of the discriminators may be executed in parallel, and processing of the discriminator learning may be performed at high speed.

In a third embodiment, as with the first embodiment, a face image of a person is input. Then a method for learning a plurality of discriminators used in a method for discriminating whether the person of the input face image corresponds to one of a plurality of specific persons will be described.

In this embodiment, unlike the other embodiments, Fern discriminators which are multi-stage discriminators, which are obtained by simplifying decision trees instead of so-called decision trees, and which are disclosed in a literature below. The Fern discriminator is a discriminator in which a plurality of element discriminators are arranged in series. As the Fern discriminators, in general, binary element discriminators which are comparatively simple are used. Specifically, in general, an element discriminator which discriminates data in accordance with a certain simple discrimination rule and outputs one of 0 and 1 as a result is used.

Mustafa Ozuysal, Michael Calonder, Vincent Lepetit and Pascal Fua, "Fast Keypoint Recognition using Random Ferns", IEEE Transactions on Pattern Analysis and Machine Intelligence, Vol. 32, No. 3, pp. 448 to 461, March 2010.

Figure 7:
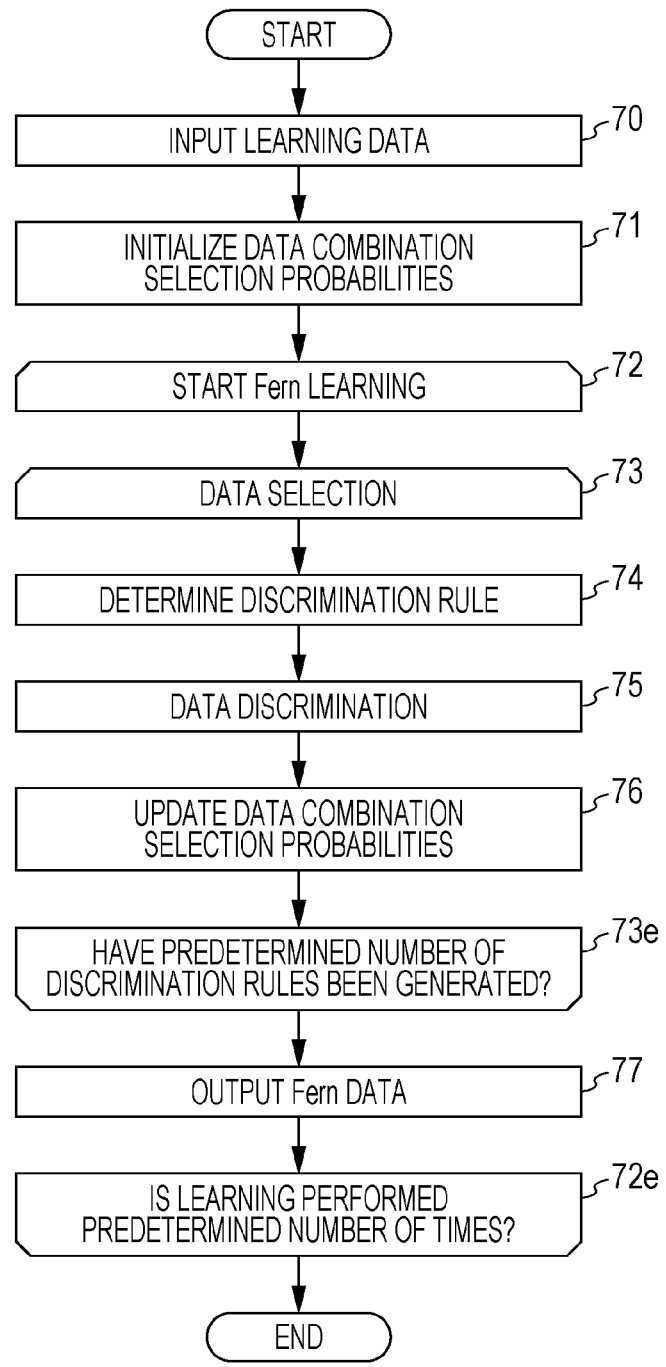
FIG. 7 is a flowchart illustrating a processing procedure of a discriminator learning method according to a third embodiment.
Figure 8:
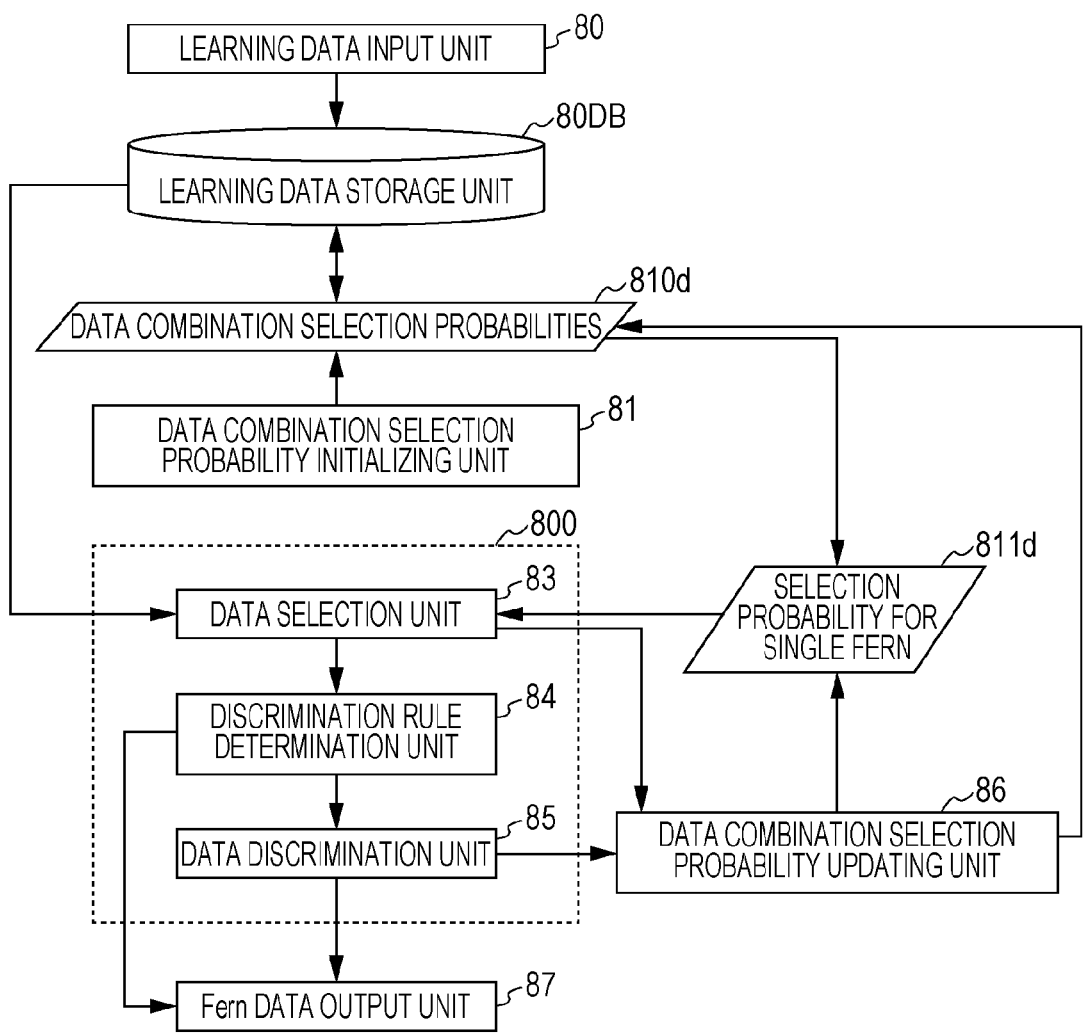
FIG. 8 is a block diagram illustrating a configuration of a discriminator learning apparatus according to the third embodiment.

FIG. 7 is a flowchart illustrating a process of the discriminator learning method of this embodiment. FIG. 8 is a block diagram illustrating a configuration of a discriminator learning apparatus of this embodiment. An example of the discriminator learning method of this embodiment will be described hereinafter with reference to FIGS. 7 and 8. In this embodiment, descriptions of portions the same as those of the first embodiment are omitted where appropriate.

In step 70, a large number of learning data used for learning of a plurality of Fern discriminators are input. This process is the same as the process in step 10 of the first embodiment. In this embodiment, as with the first embodiment, face images of a large number of persons are used as a large number of learning data in this embodiment. The process of inputting learning data in step 70 is executed by a learning data input unit 80, and learning data the same as those of the first embodiment are recorded in a learning data storage unit 80DB.

Next, in step 71, a data combination selection probability initialization unit 81 provides data selection probabilities 810*d* of combinations of the input learning data illustrated in FIG. 8, and performs a process of initializing values of the data selection probabilities 810*d*. The data selection probabilities 810*d* are similar to the data selection probabilities 21*d* of the first embodiment. However, the data selection probabilities 810*d* are not selection probabilities of individual learning data and represent selection probabilities of combinations of two learning data. The data combination selection probability initialization unit 81 sets non-negative real values to all combinations of two learning data in all the input learning data on a one-to-one basis. This data combination selection probability initialization in step 71 corresponds to a process of initializing the real value, and in this embodiment, 0 or 1 is set to all the combinations of learning data.

Specifically, 0 is set to combinations of two learning data having the same label and 1 is set to other combinations. By setting the values as described above, a combination of data having the same label is prevented from being selected. Note that, in this embodiment, as with the first embodiment, a uniform value is set to combinations of learning data having different labels. However, the present invention is not limited to this. For example, a larger value may be set to learning data which are combinations of predetermined labels. Specifically, in this embodiment, a larger value may be set to a combination of labels corresponding to a specific person.

Subsequently, in step 72, learning of a first Fern discriminator is started. A region defined by a dotted line in FIG. 8 represents a processing block 800 which performs the learning of a Fern discriminator. In this process, a process of generating single-Fern selection probabilities 811*d* which are copies of the data combination selection probabilities 810*d* at a current time for learning of the Fern discriminator is performed. The single-Fern selection probabilities 811*d* is used in step 73 described below.

Subsequently, in step 73, a data selection unit 83 performs a process of selecting a combination of two learning data in accordance with the single-Fern selection probabilities 811*d* generated in step 72. In this process, a combination of two learning data is selected from among learning data recorded in the learning data storage unit 80DB with a probability proportional to a selection probability associated with a combination of two learning data recorded in the single-Fern selection probabilities 811*d*.

In step 74, a discrimination rule determination unit 84 determines a branch rule of a Fern discriminator in accordance with the two learning data selected in step 73. Here, the discrimination rule determination unit 84 obtains a discrimination rule so that the selected two learning data are efficiently divided, and determines the discrimination rule as one of discrimination rules of the Fern discriminator. As element discriminators of the Fern element discriminators in this embodiment, a method the same as the branch method in the nodes of the decision trees of the first embodiment is used. A method for performing discrimination between 0 and 1 in accordance with a result of a determination as to whether a pixel value in a position included in image data is larger than a certain pixel value is used.

In this embodiment, as with the first embodiment, a pixel position in which a difference between selected two learning data are largest in the same pixel position is searched for and an average value of the individual pixels in the position are obtained. Then a branch rule for performing discrimination in accordance with a result of a determination as to whether a pixel value in the pixel position in which the difference is the largest is larger than the obtained average value is determined as a branch rule of the Fern discriminator. Also in this embodiment, the discrimination rule is determined in accordance with such a reference. However, the present invention is not limited to this, and an arbitrary reference may be used for determining a discrimination rule similarly to the first embodiment.

Next, in step 75, a data discrimination unit 85 discriminates all the learning data using the discrimination rule determined in step 74. The data discrimination unit 85 obtains discrimination results of 0 or 1 of all the learning data. The discrimination results of the learning data obtained here are used in step 76 and step 77 below.

In step 76, a data combination selection probability updating unit 86 performs a process of updating the data selection probabilities 810*d* and the single-Fern selection probabilities 811*d*. This process is based on the combination of learning data selected in step 73 and the discrimination results of the learning data obtained in step 75.

The data combination selection probability updating unit 86 first performs a process of making values of the data selection probabilities 810*d* corresponding to the combinations of learning data selected in step 73 small. By this, in the learning of the Fern discriminator described below, the same combination of learning data is hardly selected. In this embodiment, as with the first embodiment, update is performed by multiplying a corresponding data combination selection probability by a value equal to or smaller than 1.

Subsequently, 0 is assigned to a value of the single-Fern selection probabilities 811*d* corresponding to all the combinations of learning data having the same discrimination result in accordance with the discrimination results of the learning data obtained in step 75. By this, a combination of learning data having different discrimination results is not selected in learning of the Fern discriminator by at least one discrimination rule. Note that, as for the combination of learning data selected in step 73, the discrimination rule is determined so that different discrimination results are obtained in step 74, and accordingly, 0 is surely set to a value of the corresponding single-Fern selection probabilities 811*d*. Therefore, in the learning of the Fern discriminator, the same combination of learning data is not selected.

Then, in step 73*e*, it is determined whether a predetermined number of discrimination rules have been generated (10, for example), and when the determination is negative, the process from step 73 to step 76 described above is executed again. This process is repeatedly performed a number of times corresponding to a predetermined number of discrimination rules, and when a predetermined number of discrimination rules are generated, the process of learning a Fern discriminator is terminated. The number of discrimination rules for one Fern discriminator is basically an arbitrary number, and may be determined in advance in accordance with the number of learning data to be used, for example. The number of discrimination rules is 10 in this embodiment.

After the process of learning a single Fern discriminator is terminated, in step 77, a Fern data output unit 87 externally outputs data on the Fern discriminator in which the learning is terminated and records two pieces of information below. One of the information pieces is a predetermined number of discrimination rules determined by the discrimination rule determination unit 84. The other of the information pieces is label probability distributions of individual combinations of results of all discrimination rules of the Fern discriminator. Here, the label probability distributions of the combinations of the results of all the discrimination rules in this embodiment will be described in detail.

In this embodiment, 10 discrimination rules are used, and two types of result (0 and 1) of the discrimination rules may be obtained, and accordingly, 1024 ($=2^{10}$) combinations of the results obtained. Therefore, label probability distributions of all the 1024 combinations are recorded. The label probability distributions are generated in accordance with the discrimination results of the learning data obtained in step 75 when the Fern discriminator is learned.

Specifically, for example, a label probability distribution corresponding to all discrimination results of 0 in the 10 discrimination rules is generated in accordance with label information of learning data corresponding to all the discrimination results of 0 in all the learning data. Here, it is assumed that the numbers of learning data corresponding to individual labels having a combination S (S is a value of 10 bits in which 10 values of 0 or 1 are arranged) of a discrimination result are obtained as illustrated in the following table.

TABLE 1

| Label | The Number of Learning Data |
|---|---|
| A | 3 |
| B | 0 |
| ... | ... |
| J | 1 |
| Person other than Specific Persons | 15 |
| Total | 24 |

In this case, the label probability distributions for the combination S of the discrimination result are generated as follows: A:3/24=0.125, B:0, ..., J:1/24=0.4166 ..., and a person other than specific persons:0.625. Such label probability distributions which are probabilities for individual labels are generated for all the combinations of the discrimination results, and the generated label probability distributions are externally output.

Note that, in the Fern discriminator, a combination of discrimination results which does not have corresponding learning data also exists. In this case, in this embodiment, a label probability distribution in which a probability of a person other the specific persons is set to 1 and otherwise 0 is generated as a label probability distribution for such a combination of discrimination results. In this embodiment, when corresponding learning data does not exist, such a label probability distribution is employed. However, the present invention is not limited to this, and a label probability distribution in which all probabilities are set to 0, for example, may be employed.

After the process in step 77 is terminated, the process returns to step 72 so that the process of learning a Fern discriminator is repeatedly performed until a predetermined number of Fern discriminators are learned. When a predetermined number of Fern discriminators are generated by performing the Fern discriminator learning process a plurality of times, that is, when it is determined that a predetermined number of Fern discriminators have been generated in step 72e, the process of the method for learning a plurality of discriminators of this embodiment is terminated. It is preferable that the number of Fern discriminators is also sufficiently large. In general, it is likely that the Fern discriminators have lower capabilities relative to the decision trees used in the other embodiments, and therefore, in this embodiment, learning of 1000 Fern discriminators is performed and 1000 data of the 1000 Fern discriminators are externally output.

Since the Fern discriminators are learned by the method described above, as with the first embodiment, discrimination rules are determined using a reference for efficiently dividing learning data having different labels. Therefore, capabilities of the individual Fern discriminators may be enhanced when compared with the Fern discriminators described in the literature described above. Furthermore, data selection probabilities are provided for the individual combinations of learning data and data combination selection probabilities are made small depending on a number of times selection is performed, and in this way, a variety of learning data may be selected. Accordingly, as with the first embodiment, the various discrimination rules have been determined using the selected learning data, and as a result, variation of a plurality of Fern discriminators may be realized. As described above, also by the discriminator learning method of this embodiment, as with the other embodiments, capabilities of individual discriminators may be enhanced while variation of a plurality of discriminators is ensured. Therefore, in the pattern discrimination method using the discriminators, it is highly likely that high discrimination capabilities are realized.

An example of a pattern discrimination method for discriminating whether a person of an input face image corresponds to one of a plurality of specific persons using the Fern discriminators will be described. A basic process of the pattern discrimination method of this embodiment is the same as the pattern discrimination method of the first embodiment, and only discrimination using decision trees and a result integration portion are different, and therefore, only the portions are described.

In the pattern discrimination method of the first embodiment, discrimination is performed using decision trees. However, in the pattern discrimination method of this embodiment, discrimination using the Fern discriminators is performed. Specifically, discrimination results based on discrimination rules of the Fern discriminators are obtained relative to input data, and corresponding label probability distributions are obtained as results of the Fern discriminators in accordance with combinations of discrimination results. This process is performed on the individual Fern discriminators so that results of all the Fern discriminators are obtained.

In the first embodiment, each of results of the decision trees is a label, and the results are integrated and the integrated results are determined as a final output. Since the label probability distributions are results of a single Fern discriminator, the result of the single Fern discriminator may be integrated by weighted vote corresponding to the label probability distributions. Specifically, probability values of labels of the label probability distributions obtained as results of the Fern discriminator are voted to corresponding labels, and one of the labels corresponding to the highest value is determined as a final result. By the process described above, discrimination as to whether data on an input face image corresponds to one of a plurality of specific persons may be performed using the Fern discriminators described above.

As described above, the discriminator learning method of this embodiment is applicable not only to decision trees but also to multi-stage discriminators, such as the Fern discriminators of this embodiment, and other discriminators. Furthermore, as with the other embodiments, not only the method for setting a single selection probability to single learning data but also a method for setting a selection probability to a combination of data as described in this embodiment may be employed.

According to the embodiments described above, in learning of a plurality of discriminators used in data discrimination, learning in which discriminators have high discrimination capabilities may be realized while variation of the discrimination devices is realized. Furthermore, data discrimination having high discrimination performance may be realized using the discriminators.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-229807, filed 5 Nov. 2013, which is hereby incorporated by reference herein in its entirety.

What is claimed is:

1. A data processing method for performing learning on a decision tree used in a discriminator which discriminates an input image, the data processing method comprising:

setting a plurality of values including at least two positive values, for a plurality of learning images having respective attributes, as respective selection probabilities for the plurality of learning images;

setting an initial set of the plurality of learning images to an uppermost node of a plurality of nodes in the decision tree;

sequentially selecting a node of the plurality of nodes other than a leaf node in the decision tree from the uppermost node;

selecting a sample subset of the learning images from a set of learning images assigned to the selected node in accordance with selection probabilities of the learning images;

determining a branch rule for dividing the set of the learning images assigned to the selected node into at least two subnode subsets using the selected sample subset of the learning images;

updating the selection probabilities of the learning images by decreasing the selection probabilities for the selected sample subset of the learning images, wherein the selection probabilities are greater than zero and less than one; and assigning the subnode subsets divided in accordance with the branch rule to nodes succeeding to the selected node as respective sets for the succeeding nodes.

2. The data processing method according to claim 1, wherein in the determining of the branch rule, the branch rule is determined with reference to a degree of separation between the selected sample subset of the learning images.

3. The data processing method according to claim 2, wherein the reference corresponds to the largest difference between the selected sample subset of the learning images.

4. A data discrimination method comprising:

inputting an image to be discriminated to at least one discriminator including a decision tree in which a branch rule at a node has been determined by the data processing method set forth in claim 1; and discriminating the input image using the at least one discriminator.

5. A data processing apparatus for performing learning on a decision tree used in a discriminator which discriminates an input image, the data processing apparatus comprising:

a memory configured to store a program; and a processor configured to execute the program stored in the memory to function as:

a first setting unit configured to set a plurality of values including at least two positive values, for a plurality of learning images having respective attributes, as respective selection probabilities for the plurality of learning images;

a second setting unit configured to set an initial set of the plurality of learning images to an uppermost node of a plurality of nodes in the decision tree;

a node selection unit configured to sequentially select a node of the plurality of nodes other than a leaf node in the decision tree from the uppermost node;

a data selection unit configured to select a sample subset of the learning images a set of learning images assigned to the selected node in accordance with selection probabilities of the learning images;

a rule determination unit configured to determine a branch rule for dividing the set of the learning images assigned to the selected node into at least two subnode subsets using the selected sample subset of the learning images;

an update unit configured to update the selection probabilities of the learning images by decreasing the selection probabilities for the selected sample subset of the learning images, wherein the selection probabilities are greater than zero and less than one; and an assigning unit configured to assign the subnode subsets divided in accordance with the branch rule to nodes succeeding to the selected node as respective sets for the succeeding nodes.

6. A non-transitory computer readable storage medium storing a program which causes a computer to execute a data processing method for performing learning on a decision tree used in a discriminator which discriminates an input image, the data processing method comprising:

setting a plurality of values including at least two positive values, for a plurality of learning images having respective attributes, as respective selection probabilities for the plurality of learning images;

setting an initial set of the plurality of learning images to an uppermost node of a plurality of nodes in the decision tree;

sequentially selecting a node of the plurality of nodes other than a leaf node in the decision tree from the uppermost node;

selecting a sample subset of the learning images from set of learning images assigned to the selected node in accordance with selection probabilities of the learning images;

determining a branch rule for dividing the set of the learning images assigned to the selected node into at least two subnode subsets using the selected sample subset of the learning images;

updating the selection probabilities of the learning images by decreasing the selection probabilities for the selected sample subset of the learning images, wherein the selection probabilities are greater than zero and less than one; and assigning the subnode subsets divided in accordance with the branch rule to nodes succeeding to the selected node as respective sets for the succeeding nodes.

7. The data processing method according to claim 1, wherein each of the learning images corresponds to a set of feature amounts obtained from an image for learning.

8. The data processing method according to claim 7, wherein the attributes of the learning images represent their respective discrimination capability.

9. The data processing method according to claim 8, wherein in the setting of the selection probabilities, the selection probabilities for the plurality of learning images are determined in accordance with their respective discrimination capability.

* * * * *